June 9, 1925. 1,541,455

G. C. WHITE

PLUMB AND LEVEL INSTRUMENT

Filed April 14, 1924 2 Sheets-Sheet 1

Inventor
G. C. White
By C. A. Snow & Co.
Attorneys.

June 9, 1925.  G. C. WHITE  1,541,455
PLUMB AND LEVEL INSTRUMENT
Filed April 14, 1924   2 Sheets-Sheet 2

Inventor
G. C. White
By C A Snow & Co.
Attorneys

Patented June 9, 1925.

1,541,455

UNITED STATES PATENT OFFICE.

GEORGE C. WHITE, OF MIAMI, FLORIDA.

PLUMB AND LEVEL INSTRUMENT.

Application filed April 14, 1924. Serial No. 706,447.

*To all whom it may concern:*

Be it known that I, GEORGE C. WHITE, a citizen of the United States, residing at Miami, in the county of Dade and State of Florida, have invented a new and useful Plumb and Level Instrument, of which the following is a specification.

This invention aims to provide a combined plumb and level, so constructed that, by the operation of a single pendulum, either a vertical line or a horizontal line may be secured. The invention aims, further, to provide novel means for mounting the pendulum.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown, can be made, without departing from the spirit of the invention.

In the accompanying drawings:—

Figure 1:
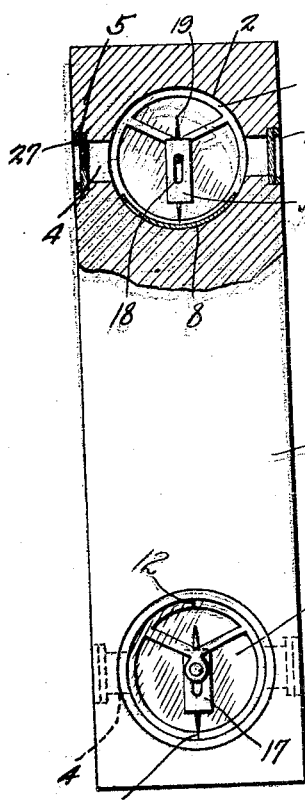
Figure 2:
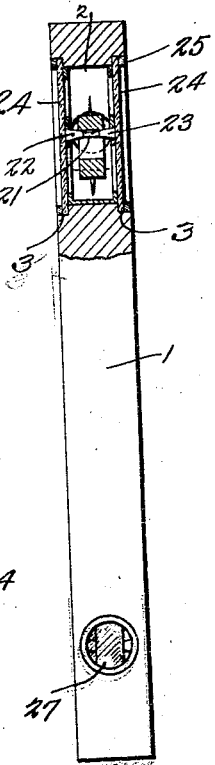
Figure 3:
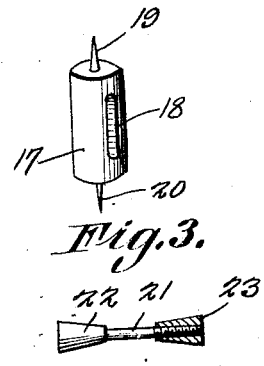
Figure 4:
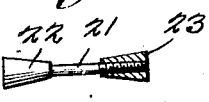
Figure 5:
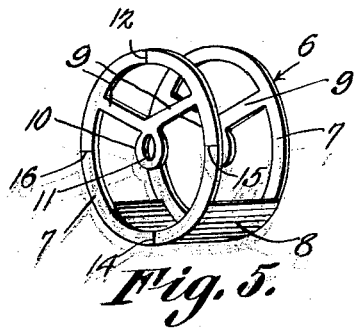
Figure 6:
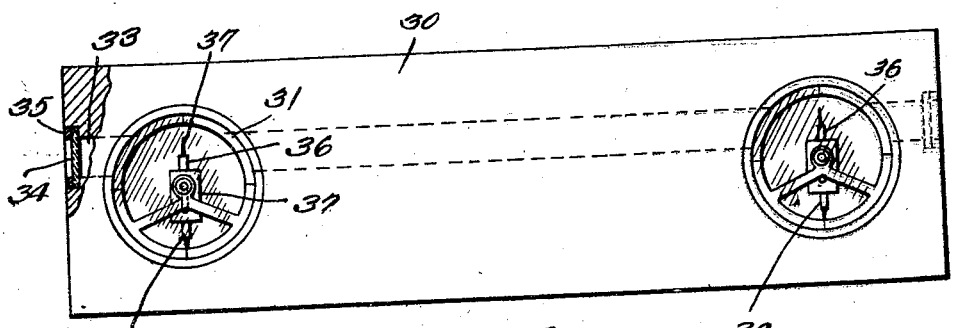
Figure 7:
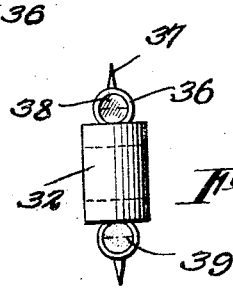
Figure 8:
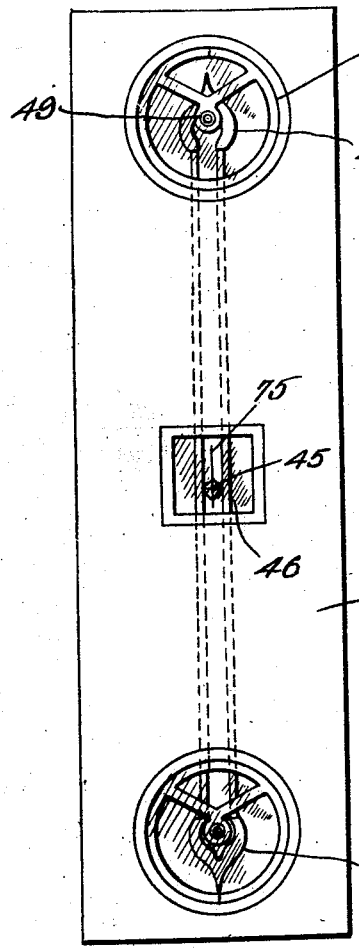
Figure 9:
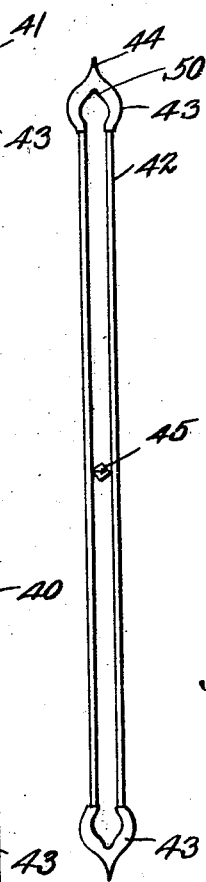
Figure 10:
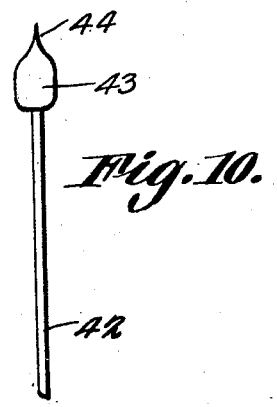
Figure 11:
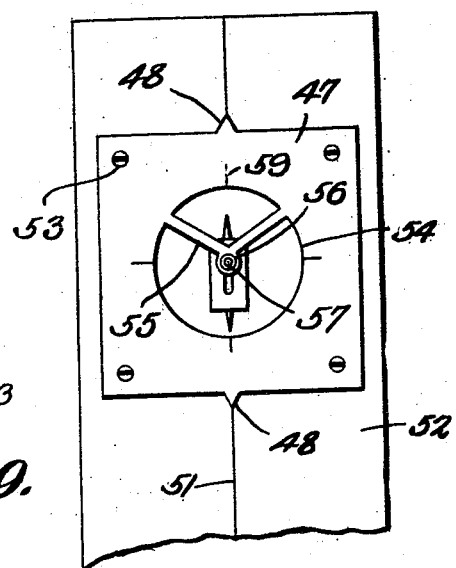

Figure 1 shows in elevation, a device constructed in accordance with the invention, parts being in section; Figure 2 is an elevation wherein the implement is viewed at right angles to the showing of Figure 1, parts being in section; Figure 3 is a perspective view disclosing the pendulum; Figure 4 is an elevation showing the pivot element for the pendulum, parts being in section; Figure 5 is a perspective view, disclosing the frame, whereon the pendulum is mounted; Figure 6 is an elevation showing a modified form of the invention; Figure 7 is an elevation showing the pendulum used in Figure 6; Figure 8 is an elevation showing a modified form of the device; Figure 9 is an elevation showing the pendulum used in the form of the invention which appears in Figure 8; Figure 10 is an elevation wherein a portion of the pendulum of Figure 9 is viewed at right angles to the showing of that figure; and Figure 11 is a fragmental elevation showing a modified form of the invention.

Referring to Figures 1, 2, 3, 4 and 5, the device is shown as comprising a body or stock 1, provided adjacent to each end with a transverse circular chamber 2, there being enlarged recesses 3 in the body 1, at the outer ends of the chamber, as shown in Figure 2. The body 1 has transverse bores 4, located on opposite sides of the chamber 2 and communicating with the chamber, the axis of the bores 4 being disposed at right angles to the axis of the chamber 2. Enlarged recesses 5 are formed in the body 1 at the outer ends of the transverse bores.

The device comprises a frame, denoted generally by the numeral 6 and shown in detail in Figure 5, the frame embodying side rings 7 connected by a curved base 8, the rings 7 having arms 9 which converge, and are joined to a hub 10 having an opening 11. The rings 7 have marks 12 and 14, disposed opposite to each other, and the rings are provided with marks 15 and 16, disposed opposite to each other, the marks 15 and 16 being disposed 90 degrees remote from the marks 12 and 14.

The device includes a cylindrical pendulum 17 having a longitudinal slot 18, the pendulum being equipped at one end with a pointer 19 and being supplied at its opposite end with a pointer 20. A pivot element 21 is provided, the same being equipped at one end with a fixed conical head 22 and being provided at its opposite end with a head 23 which is threaded on the pivot element 21. The heads 22 and 23 are received in the openings 11 of the hubs 10 of the frame 6, the pivot element 21 passing through the slot 18 in the pendulum 17, the frame 6 being so shaped that it will fit securely and snugly in the chamber 2 of the stock 1.

Transparent plates 24 are mounted in the recesses 3 at the ends of the chamber 2 and are held in place in any desired way, as indicated at 25. Similarly, transparent plates 26 are disposed in the recesses 5 at the outer ends of the bores 4 and are secured therein as indicated at 27.

When the device is located as shown in Figure 1, the pointers 20 on the pendulums 17, coacting with the marks 14 on the frames 6, will indicate that the body 1 stands vertically. When the instrument is turned end for end, from the position shown in Figure 1, and the pointers 19 will come into play, the same coacting with the marks 12 on the frames 6, elongated slots 18 in the pendulums 17 permitting the pendulums to slide on the pivot elements 21, thereby shifting the center of mass of each pendulum. The instrument may be disposed horizontally, or at right angles to the position which it occupies in Figure 1, and, then, the pointers 19 will coact with the marks 16 on the frames 6, and the pointers 20 will coact with the marks 15, thereby to indicate that the body 1 is disposed in a level position.

In Figures 6 and 7, the body is shown at 30, the frames at 31, and the pendulums at 32. The device shown in Figures 6 and 7 may be used either for a plumb or a level, but it may be used, also, as a sighting level. Having this consideration in mind, the body 30 is provided with a longitudinal bore 33, transparent plates 34 being held at 35 in the body 30 at the ends of the bore 33. Each pendulum 32 is supplied at each end with a frame 36, carrying the pointers 37. Within each frame 36 is retained a transparent plate 38, having transverse lines 39, spaced apart at their inner ends. It will be obvious that when the lines 39 on the two pendulums coincide, a level will be secured, cross lines being marked on the plates 34, if desired.

In the form shown in Figure 8, the body is denoted by the numeral 40, and the frames appear at 41, the pendulum 42 being in one piece and having enlarged heads 43 at its ends, the heads terminating in pointers 44. The body 40 is hollow, so that the pendulum 42 can have some swinging movement, and the pendulum has enough longitudinal movement on the pivotal elements 49 which support it, so that the instrument can be turned end for end, as hereinbefore described. Intermediate its ends, the pendulum 42 is supplied with an indicator 45 which is visible through transparent plates 46 mounted in the body 40, the indicator being adapted to cooperate with marks 75 on the plates. The part 45 may be used in some classes of work, more conveniently than can the end indicators 43. At its ends, the pendulum 43 is provided with pointed seats 50 which serve to center the pendulum on the pivotal elements 49.

In the simplified form shown in Figure 11, the frame 6 of Figure 5 is replaced by a plate 47 provided with projections 48 adapted to cooperate with a longitudinal mark 51 on the body 52 of the instrument, the plate being held in place on the body by securing elements 53. The plate 47 has an opening 54 into which project arms 55 converging into a hub 56 carrying a pivotal element 57 whereon the pendulum 58 is mounted, the pendulum operating in a hole in the body 52 and being of the form shown in detail in Figure 3. The indicating marks 59 on the plate 47 correspond in function to the marks 12, 14, 15, and 16, of Figure 5.

Reverting to the form shown in Figure 1, it may be stated that the cross bores 4 are used in connection with the pendulum 17, when the instrument is disposed in a position at right angles to that which it occupies in Figure 1.

The instrument hereinbefore described may be used by operative masons, and other workmen, to erect perpendiculars, and to lay horizontals, and, in addition, the form shown in Figure 6 may be used as a sighting level.

Having thus described the invention, what I claim is:—

1. A device of the class described comprising a stock, a pendulum, and pivot means for the pendulum, the pivot means being carried by the stock, and the pendulum having an elongated opening wherein the pivot means is received, thereby permitting a shifting of the center of mass of the pendulum with reference to the pivot means, when the stock is turned end for end.

2. A device of the class described, comprising a stock, a frame located in the stock and provided with marks, a pivot element mounted on the frame, and a pendulum provided at both ends with pointers adapted to cooperate with the marks, the pendulum being provided with an elongated slot, the pivot element being received within said slot to permit a shifting of the center of mass of the pendulum with reference to the pivot means when the stock is turned end for end.

3. A device of the class described comprising a frame having side rings provided with marks and a connection between the rings, the rings having arms carrying hubs, a pivot element mounted in the hubs, and a pendulum having pointers at both ends, the pendulum having an elongated slot receiving the pivot element.

In testimony that I claim the foregoing as my own, I have hereto affixed my signature in the presence of two witnesses.

GEORGE C. WHITE.

Witnesses:
 GEO W. GAMBLE,
 B. C. PEDDY.